(12) United States Patent
Gallelli et al.

(10) Patent No.: US 10,683,853 B2
(45) Date of Patent: Jun. 16, 2020

(54) METHOD FOR THE PRODUCTION OF ENERGY FROM A ROLLING MOTION

(71) Applicants: Vincenzo Gallelli, Soverato (IT); Nicola Carelli, Davoli (IT)

(72) Inventors: Vincenzo Gallelli, Soverato (IT); Nicola Carelli, Davoli (IT)

(*) Notice: Subject to any disclaimer, the term of this patent is extended or adjusted under 35 U.S.C. 154(b) by 1132 days.

(21) Appl. No.: 14/761,614

(22) PCT Filed: Dec. 11, 2013

(86) PCT No.: PCT/EP2013/003740
§ 371 (c)(1),
(2) Date: Jul. 16, 2015

(87) PCT Pub. No.: WO2014/090400
PCT Pub. Date: Jun. 19, 2014

(65) Prior Publication Data
US 2015/0361967 A1    Dec. 17, 2015

(30) Foreign Application Priority Data
Dec. 13, 2012 (IT) .......................... M02012A000305

(51) Int. Cl.
*F03G 7/08* (2006.01)
*F15B 1/02* (2006.01)
*F15B 11/032* (2006.01)
*F15B 3/00* (2006.01)
(Continued)

(52) U.S. Cl.
CPC .............. *F03G 7/08* (2013.01); *F01D 15/10* (2013.01); *F03B 1/02* (2013.01); *F15B 1/024* (2013.01); *F15B 3/00* (2013.01); *F15B 11/032* (2013.01)

(58) Field of Classification Search
CPC ... F01D 15/10; F03B 1/02; F03G 7/08; F16K 11/12; F15B 11/032; F15B 1/024; F15B 3/00
See application file for complete search history.

(56) References Cited

U.S. PATENT DOCUMENTS 6,295,914 B1   10/2001  Iversen
6,756,694 B2*   6/2004  Ricketts ................... F03G 7/08
                                                      290/1 R
2002/0029443 A1   3/2002  Ortiz
(Continued)

FOREIGN PATENT DOCUMENTS

CD       186530 A    9/1936
GB       635634 A    4/1950
GB     2454 683 A    5/2009

*Primary Examiner* — Laert Dounis
*Assistant Examiner* — Edward Bushard
(74) *Attorney, Agent, or Firm* — John Alumit (57) ABSTRACT

A method for the production of hydraulic and electric energy from rolling vehicular and non-vehicular traffic, establishing a flow of fluid moving between at least two tanks, the first tank being an accumulation tank, with a fixed volumetric capacity, and the second is tank being an expansion tank, with a volumetric capacity varying between two limit conditions, namely, full and empty. The flow is established by two independent circuits, the second of which is activated after the first, the latter being generated, in turn, by the rolling motion of the vehicular and non-vehicular traffic. The first and second circuit have a flow and pressure reducer system interposed there between.

4 Claims, 7 Drawing Sheets

(51) Int. Cl.
*F01D 15/10* (2006.01)
*F03B 1/02* (2006.01)

(56) References Cited

U.S. PATENT DOCUMENTS

| | | | |
|---|---|---|---|
| 2003/0132636 A1 | 7/2003 | Rickets | |
| 2008/0224477 A1 | 9/2008 | Kenney | |
| 2010/0089063 A1* | 4/2010 | McBride | F15B 11/032 60/682 |
| 2015/0192017 A1* | 7/2015 | Quiros Morales | F15B 21/14 417/53 |

* cited by examiner

METHOD FOR THE PRODUCTION OF ENERGY FROM A ROLLING MOTION

BACKGROUND

The present invention relates to the field of systems to recover dispersed energy and, more specifically, to an apparatus and a method for obtaining electrical energy from the movement of road vehicles.

There is a need felt to obtain electrical energy by means of alternative systems in order to reduce emissions and production costs.

The method presented here is based on hydraulic principles and on the particular set of components in the system used.

Furthermore, the system can find application in the field of renewable energy sources, allowing users to supply energy to the grid, at any time, as is discussed in detail in the following Summary, Description, and Claims.

SUMMARY

The aim of the present invention is a system for the captive production of electricity produced from the rolling motion of a vehicle over a surface. The primary embodiment, in which the motion is generated by vehicle movement, has been chosen because of the lack of complexity involved.

The system uses force applied to automatically activated hydraulic pumps which are activated automatically as cars pass over them. The principle is to exploit the weight of each vehicle applied during the rolling motion of the vehicle over the surface.

A further aim of the invention is to make hydraulic energy available by performing the functions of a lifting pump or a pressurization pump which allows water tanks in a public network to be supplied.

More specifically, the passage of cars over defined portions of the roadway leads to the compression of the hydraulic pumps housed in the roadway and the pumping of a fluid within a closed circuit. The flow and pressure rates obtained will be used to move a second fluid within a second closed circuit, preferably, a water circuit. This second fluid will allow the activation of, for example, a turbine directly coupled to an asynchronous generator.

In other words, when the fluid in the first circuit reaches defined pressure rates, signalled by a pressure switch, this results in the circulation of the fluid, at the desired pressure and flow rates in the relative branch, by means of a unidirectional valve activated by the pressure switch on the line. The activation of a distributor, controlled by suitable limit switches, transfers the fluid to an actuator unit or a flow rate multiplier, which converts the flow and pressure rates of the first fluid into the flow and pressure rates desired for a second fluid, in this case, water. In turn, the second circuit drives, for example, a Pelton turbine.

The return water is collected in a tank and then reutilised within the cycle.

The advantages derived from the system in question are:
high performance with lower maintenance costs,
less noise,
less risk of failures,
simplicity of plant engineering due to absence of reduction units and gears.

Although the system requires hydraulic accumulators, and therefore a pit or an appropriate space in relation to the power to be obtained, this system makes it possible to have electrical power which is easy to convey into the national grid at low voltage without needing inverters or other particular devices.

The system can be manufactured using pre-assembled kits with a predetermined power and therefore industrial scale production of the invention is possible.

By applying certain measures, described hereinafter, the system can augment power generated by solar and wind sources, during periods in which the sun or wind is lacking, using the rolling motion of vehicles and the consequent production of hydraulic and electrical energy.

The aforesaid aims and advantages are achieved by the method and system, in question in the present invention, for the transformation of an hydraulic flow into electrical energy by means of road vehicles.

BRIEF DESCRIPTION OF FIGURES

This and further characteristics of the invention will be better highlighted in the following description of some embodiments thereof, illustrated, in the form of a non-limiting example, with the help of accompanying drawings.

DESCRIPTION

The system designed to produce electrical energy according to the method in question is illustrated below with particular reference to the figures.

According to a first embodiment, the activation of the system in question is performed by means of a motor vehicle 100 while the said vehicle is travelling on the road.

In the example, the system utilizes a pair of artificial platforms or strips 102, embedded into the roadway. Below each platform there is a plurality of rows of equidistant compression and pumping units 4 for a hydraulic circuit which is described later.

The rows of compression units may be placed adjacent one another, however they may also be positioned spaced without going beyond the scope of the invention.

The compression unit 4 comprises a series of small pistons positioned in parallel (as shown in the figures) which, as a result of the passage of motor vehicles, move a predetermined volume of fluid under pressure, the rate of which depends on the weight of the vehicles.

It should be emphasized that the strokes performed within these compressor units 4 shall be such as to ensure safe and comfortable transit; no sudden changes or discontinuities shall be felt which could disturb the driver's actions and cause driving instability.

To convert the hydraulic energy into electrical energy, the system transmits the power obtained from the first fluid (oil)—as a result of the compression experienced with the passage of vehicles or any rolling means—to the second fluid (water).

This transmission is a transmission of pressure and flow rates suitable for the operation of a conventional power generation system downstream, such as a Pelton turbine or microturbine. After this, the known transformation process is carried out using a directly coupled asynchronous generator, thus achieving the desired effect.

The aforesaid transmission of power is performed by means of a multiplier, i.e. two actuators, connected together, with different sections, which are used in order to obtain an increase in flow rate, since the first fluid (oil) is under high pressure, while the second (water) is required under a lower pressure and with higher flow rates.

Figure 1:
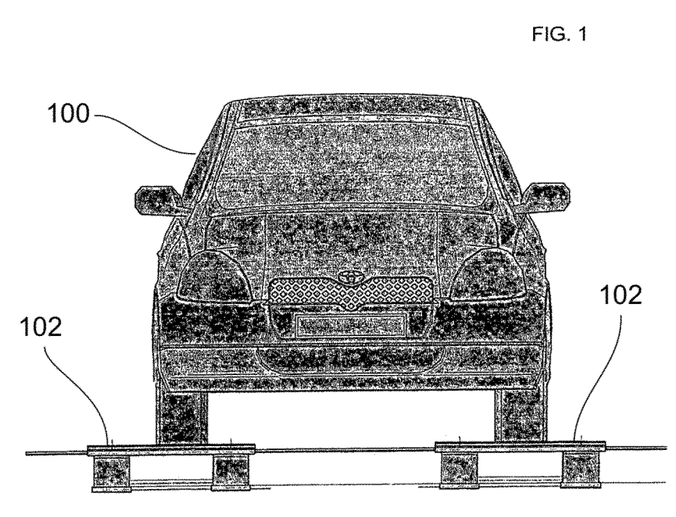
FIG. 1 illustrates a front view of an example platform section.
Figure 1B:
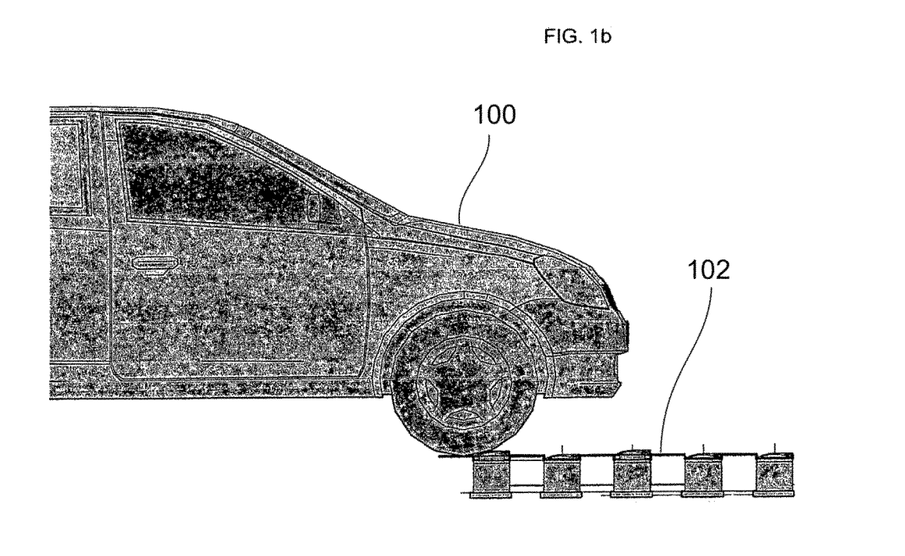
FIG. 1B illustrates a side view of an example platform section.
Figure 2:
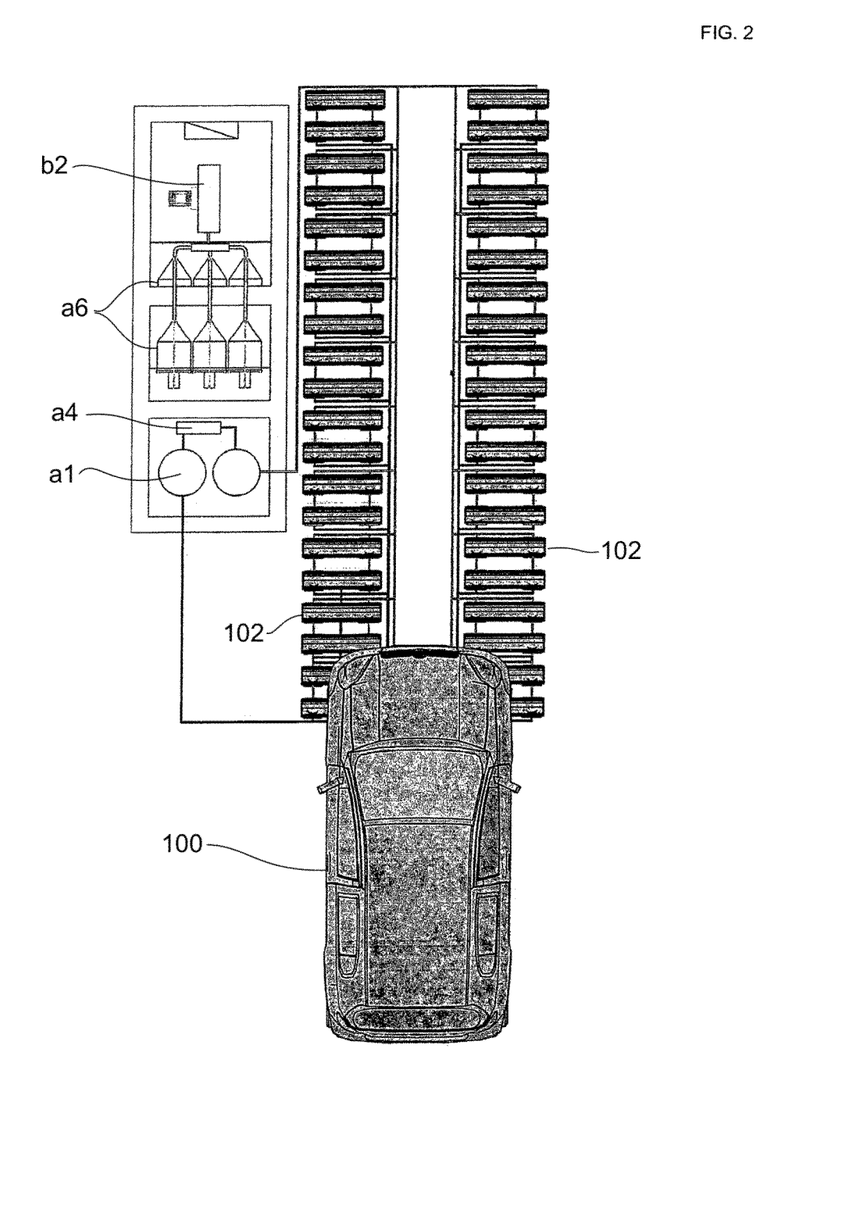
FIG. 2 illustrates a plan view of the platform, with a plurality of pumping means and a processing circuit therefor.

With particular reference to FIGS. 1 and 2, a compression unit is illustrated, represented by a double platform consisting of a longitudinal strip with a suitable width for a vehicle wheel; preferably, an entire lane will not be occupied, only two strips under the tires, since it is rare that a tire travels over the central area. Nevertheless, there is nothing to stop the platform from being configured to extend across the entire lane.

To cover the aforesaid platform, there will be a coating, such as a vulcanized rubber mixture, consisting of modular sectors with male-female joint and alignment hinges; likewise, the platform may feature an intermediate element made of dimpled, non-slip rubber with reflective elastoplastic laminated inserts.

In any case, the aforesaid platform is suitable to be embedded at road surface level. In the case shown in the FIGS. 1 and 2, the double platform is fixed rigidly to the roadway in two strips.

Each strip is divided into rows of N plates, N representing some number of individual plates according to preference, each plate coupled to two compressors, respectively.

The vehicle's passage over a plate will result in the compression of one or more compression units or hydraulic pumps, which are illustrated in the drawings as small, vertically sliding pistons with a spring returning them to the original position.

In order to achieve uniform pressure distribution (given the varying nature of the pressure on the surface of a plate), the pair of cylinders is connected hydraulically. In this way, the pressure and flow rates achieved are in the desired range upon the passage of the motor vehicles.

The heads of the small pistons in the compression unit are therefore protected by the metal plate and by a coverage coating; the coating will be of a suitable thickness to allow resistance to the shear forces which are generated upon the passage of a vehicle, in addition to constituting a means of protection.

The shape of each plate is such as to optimize the outer surface in order to render the passage of the wheel smooth and to optimise the inner surface for the coupling with a pair of cylinders.

A further goal is to decrease the degree of resistance to a rolling vehicle and achieve a compression action.

The plate slides into the frame equipped with side guides so as not to transmit shear forces onto the compressor unit.

These units, with support bases in the ground, can be rendered integral to the frame in order to take into account any differential subsidence which may occur and correct it quickly.

The small pistons will establish a unidirectional flow from the tank to one or more accumulators of either piston type or diaphragm type.

Adopting one or more accumulators serves the purpose of maintaining hydraulic energy, as well as overcoming any insufficient compressor unit flow rates, while also allowing power savings.

By activating the respective valves upstream of each branch, the line pressure switches (see diagram in FIG. 5) will set off the relative flow.

Figure 5:
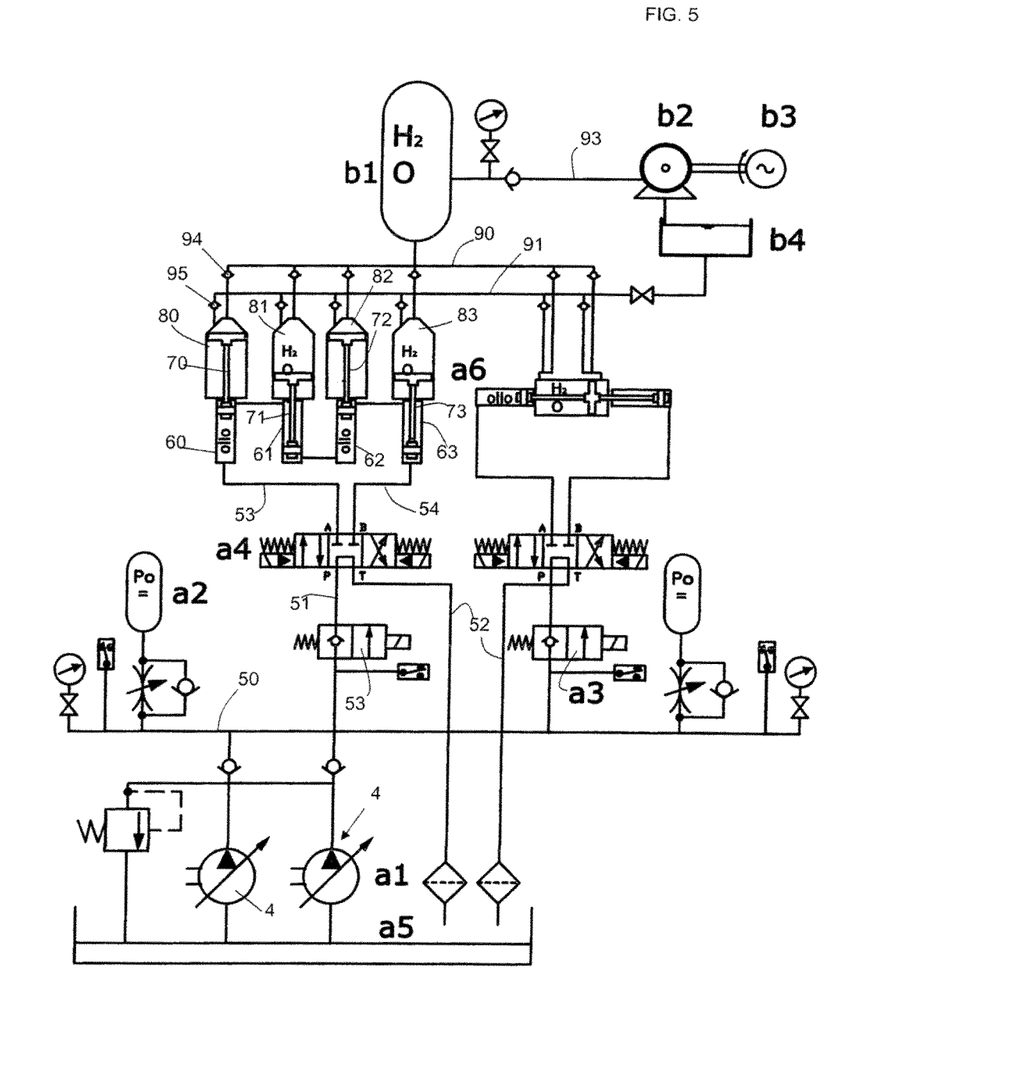
FIG. 5 illustrates a diagram of the basic components of the system, with the fluid-powered and hydro-powered circuits coupled thereto.

In fact, they allow the start of the distributor 4/3 and the start of the stroke cycle controlled by the flow rate multiplier sensors.

In the diagram, note the presence of two branches with two different types of multipliers. In fact, these can be scaled based on the desired pressure and flow rates. Two construction types are illustrated here.

The turbine, or possibly another accumulator is supplied by the multiplier with the second fluid (water) at a certain flow and pressure rate.

In this case, adopting the water accumulator allows the flow in the turbine to be stabilized and the correct running speed to be maintained for proper operation of the asynchronous generator coupled directly to the shaft, without the use of reduction units or anything else.

Figure 3:
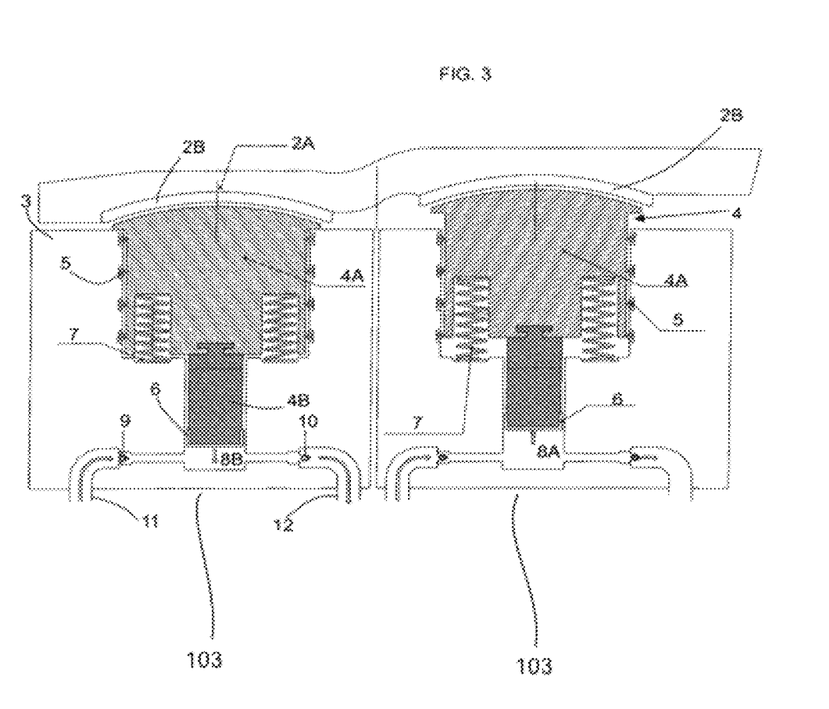
FIG. 3 illustrates, in diagram view, two pumping elements, namely two small pistons according to two configurations.
Figure 4:
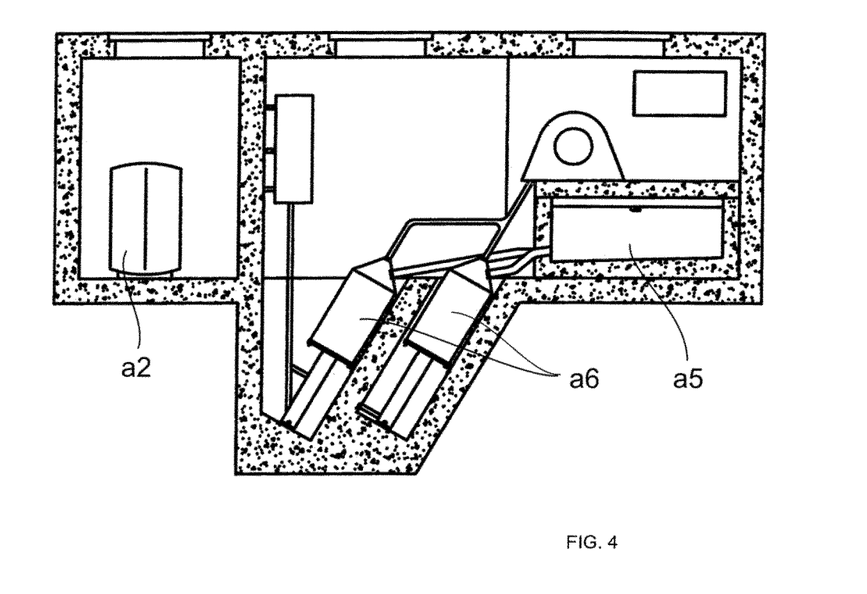
FIG. 4 illustrates a cross sectional view of a detail of a pit, where the hydraulic and electrical components of the invention are housed.

With particular reference to FIGS. 3 and 4, the compression unit is described in detail and consists of two sliders 4A and 4B, each of which has a different section and which are mutually integral.

These cylindrical sliders slide vertically in the corresponding seats.

Sealing gaskets are placed on the said sliders 4A and 4B.

Unit 4 is maintained in position by two or more springs 7 which act between the body 3 and the slider 4A.

For the said resting position, the slider 4B establishes an expansion chamber 8A; following the downward thrust brought about by the weight of the transiting vehicle, while descending, the sliders 4A and 4B reduce the chamber 8A, which becomes smaller in volume, as shown in the figure with 8B.

This change in volume of the inner chamber produces a flow of fluid. Thanks to suitable non-return valves 9 and 10, on each unit 4, a flow is established which delivers the fluid to the circuit; during the expansion phase, the fluid is recalled (i.e. the initial configuration of the chamber 8 is restored following the thrust of the springs 7) by means of a unidirectional valve 9 connected to the input conduit 11 and coming from the collection tank 17.

The small pistons 4 are designed to be controlled during compression by the transiting vehicles and during expansion by spring return means.

Higher pressure rates can be achieved by the following expedience: the pairs of units connected, in series, to the first unit, expand as a result of the passage of fluid into the chamber and the plate is lifted; this force is stored by the presence of a ballast plate and the positioning of springs with greater rigidity, which work by traction, arranged inside or outside the compression unit.

Following the passage of the wheel over this plate, the weight and the force accumulated is then transmitted.

The fluid pressure increases and reaches rates which allow it to be accumulated.

This multi-stage compression is used when the vehicle axle loads are not sufficient to ensure the minimum pressure rates required. It is therefore important to know the composition of the vehicles. The system described can be extremely and appropriately flexible.

Figure 6:
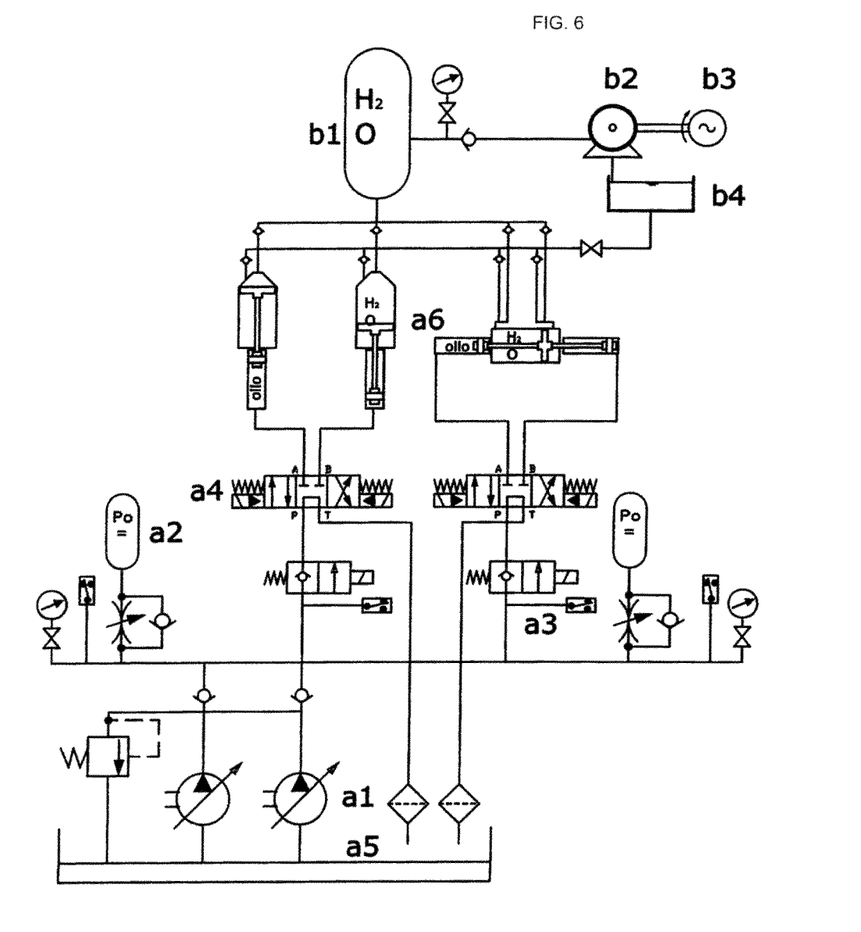
FIG. 6 illustrates a diagram of a second closed circuit.

All the components described result in the diagram of the system in FIGS. 5 and 6.

With reference to FIGS. 5 and 6, the diagram of the operation achieved by the present invention can be observed.

The pumping elements, i.e. the aforementioned small pistons 4, are represented in the diagram by a series of pumps denoted by a1, since the function thereof is precisely equivalent to that of a pump or a fluid compressor unit.

By means of the said small pistons/pumps a1, the fluid is drawn from the tank a5 and sent to one or more accumulators a2, via the line 50 which represents the relative conduit of the first fluid circuit.

Following the action imparted to the small pistons, by means of the passage of the vehicle, the pumps a1 will deliver a flow of fluid and then accumulate pressure inside the accumulator a2.

On the line 50 there is also an associated pressure switch designed to detect the pressure thereof. Once the preset pressure rate is achieved, the pressure switch (set to maximum pressure) gives clearance, i.e. a signal issued to the programmable logic controller (PLC) which activates a relay to open one or more line valves, denoted in FIG. 5 by a3.

The valve connects the upstream line 50 with the downstream line, i.e. line 51, which—in turn—is connected to a distributor a4. The distributor a4 is a three-position, four-way distributor; in the first position, i.e. the central one, the fluid is conveyed directly from the line 51 to the discharge line 52 and cannot continue downstream of the distributor. The second and third positions, on the contrary, allow the passage towards the lines 53 and 54 alternately, the said lines being connected respectively to the two cylinders denoted by 60 and 63.

The said cylinders are part of the aforesaid system a6, i.e. a flow rate multiplier system; basically, several cylinders 60, 61, 62, and 63 are reciprocally connected in series so that the outlet of the first cylinder corresponds with the input of the next cylinder, while the first and the last cylinders are connected to the aforesaid lines 53 and 54.

In this way, by activating the distributor a4, the said distributor switches from the central position to the right and left, alternately, in order to direct the first fluid to the branch 53 first of all and then to branch 54 and to create an alternating motion between the respective rods 70, 71, 72, 73 of the aforesaid cylinders.

Also illustrated in the diagrams is a series of pressure reducers a6, positioned in series, but which can also be single.

In practice, when activated towards the right, the distributor allows the passage of the fluid, in the delivery phase, via branch 53 towards the corresponding cylinder 60 and, in the return phase, from the cylinder 63 and line 54; when switched towards the left, the opposite occurs, i.e. the distributor allows the passage of the fluid, in the delivery phase, via branch 54 towards the corresponding cylinder 63 and, in the return phase, from cylinder 60 and line 53.

The fluid contained between two cylinders in series will remain confined in the relevant branch, flowing into or the other depending on the position of the distributor.

The elements designed to change the position of the distributor a4 are the limit switch elements which issue a suitable signal to the PLC; the alternating cycle of the distributor a4 terminates when the minimum pressure in the accumulator is achieved and signalled by the pressure switch minimum threshold. Once the minimum pressure threshold has been reached in the accumulator a2 and in the branch 50, both the valves a3 and the distributors a4, are brought back to the initial rate, i.e. as shown in FIG. 5.

Summing up, from the primary fluid collection tank a5 to the pumps a1, which represent the compression units, stated as being two in number due to the presence of two longitudinal strips (double platform), the said first fluid is conveyed into the two accumulators a2, which are mutually different in terms of operation pressure range, which varies from the pre-load value to the maximum pressure rate; when it is signal that the load value has been met, by means of the pressure switch, and the pressure rate has been detected in the relative branch, the valve 2/2 a3 is activated and the distributor 4/3 a4 is controlled via the establishment of the flow in the flow pressure reducers a6, with an outbound stroke, and the subsequent switching of the distributor 4/3 a4 by the limit switches and so on.

It should be noted that in the absence of vehicles, the system is not loaded, and therefore the cycle cannot be activated.

The presence of controllers, such as PLCs, is necessary in order to have more input signals and to guarantee greater system control and reliability.

So far, the description has concentrated on the first part of the operating diagram, i.e. that of the first fluid circuit activated by the rolling motion.

The present invention will now describe how the exchange and the activation of the second fluid takes place, and the water which is required to activate the converter.

Note the presence of a second circuit, denoted by 90, 91, 93 with reference to the respective reciprocally connected branches interposed between an accumulator b1, a tank b4, a turbine b2 and generator b3, and a plurality of fluid compression chambers 80, 81, 82, 83.

Additionally, the circuit is equipped with a series of unidirectional valves for correct flow circulation; the valves are denoted by 94, 95. From the tank b4 the fluid is recalled, as described hereinafter, into the conduit 91, and then into the compression chamber 80, 81, 82, 83, after which it can no longer flow back due to the presence of the valves 95; as a result of compression, the flow is sent to the branch 90 and then to the accumulator b1; likewise, the valves 94 prevent the return thereof.

The second fluid begins to circulate and to flow into the corresponding accumulator b1 by means of the aforesaid cylinders 60, 61, 62, and 63; in fact, the rods thereof 70, 71, 72, and 73, protrude and penetrate the compression chambers 80, 81, 82, and 83, where the relative pistons first draw up the water and subsequently send the said water, under pressure, towards the accumulator b1 which, once the fill value has been reached, starts to discharge at a slow pace (in thermodynamic terms, in the order of three minutes) and flow into the turbine b2 coupled to the generator b3. Finally, the output water is collected in the tank b4 and then flows into the flow pressure reducer a6 positioned at a lower level in order to exploit the downwards motion and facilitate the suction during delivery.

Therefore, the fluid is driven economically by means of the passage of cars over defined portions of the roadway, where the compression and pumping means or units are placed, forming part of the said circuit.

In other words, the compression means or units are driven by means of the pressure from the vehicle transiting thereupon, which establishes a flow of fluid moving between at least two tanks, the first of which is an accumulation tank, with a fixed volumetric capacity, and the other an expansion tank, with a variable volumetric capacity (which varies between two limit conditions, namely full/empty).

The present invention will now describe an application variant.

As is well known, small and large grid-connected photovoltaic and wind turbine systems supply energy only at certain times of the day.

To overcome this, energy must be accumulated.

At present, fuel cell systems for photovoltaics are under development.

With the system described, continuous production can be ensured.

Figure 7:
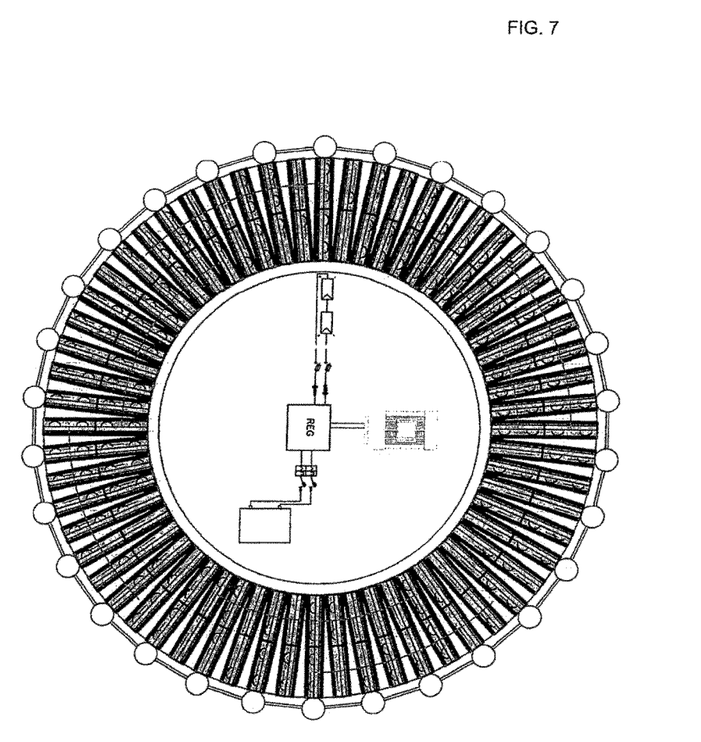
FIG. 7 illustrates an alternative embodiment used in a continuous motion setting, which is particularly suitable for use with renewable energy sources.

FIG. 7 shows a circular development of the "mat" and the block diagram.

Apart from the grid, a photovoltaic system is also connected (by means of an inverter which, for the sake of simplicity, is not shown) to a charge regulator and an accumulator to power a direct current electric motor.

The motor supplies the necessary power to a vehicle, or even simply a moving rotary axis with a specified weight, to overcome the rolling and aerodynamic forces and the inertial force at start-up.

The accumulators are smaller and less bulky since the energy and the power obtained are higher than envisaged and attainable in a conventional mains connection.

In this way, the system can even provide energy at night or during periods with low sunlight.

The proposed system also finds application in metropolitan railways equipped with Light Railway Transit Vehicles, also known as light vehicles with rubberised wheels. This particular system of driving allows the insertion of sections of "mat" and therefore the recovery of energy which can be stored in the substation.

The invention claimed is:

1. An apparatus for converting hydraulic energy to electrical energy for operation of a conventional power generation system, said apparatus being activated by a motor vehicle passing over the apparatus, the apparatus comprising:
   a pair of artificial platforms (102) embedded into a roadway, below said platform is a plurality of rows of hydraulic compression units for a hydraulic circuit; said platform covered by a coating;
   said compression units comprising a series of pistons (4) positioned in parallel, a first cylinder slider (4A) mutually integrated with a second cylinder slider (4B), at least two springs that act between a body of said compression units and the first cylinder slider, and an expansion chamber (8A) upon which the second cylinder slider (4B) rests, a first non-return valve and a second non-return valve, an input conduit; said expansion chamber (8A) being reduced in volume by the weight of a passing the motor vehicle upon the first cylinder slider and the second cylinder slider, with the change in volume producing a flow of fluid; said expansion chamber being restored to its initial volume by a thrust of said springs; said first non-return valve (9) and said second non-return valve (10) delivers said flow of fluid to the hydraulic circuit when the expansion chamber (8A) is reduced in volume, while said thrust of the springs restores the expansion chamber to its original volume resulting in a recall of the flow of fluid from through the input conduit (11);
   a first collection tank (a5) from which a first fluid is drawn by the pistons;
   at least one first accumulator (a2) to which the first fluid is sent by way of a line, said line being a conduit to a first fluid circuit;
   a relay to open at least one line valve (a3);
   said at least one line valve (a3) connects an upstream line (51) with a downstream line (51), which in turn connects to a three-position, four-way distributor (a4), where the first position conveys the first fluid from the upstream line to a discharge line (52) and cannot continue downstream to the distributor and the second and third positions allow passage through a first line (53) and second line (54) to a flow rate multiplier system;
   said flow rate multiplier system comprising four cylinders (60, 61, 62, 63) reciprocally connected in series so that the outlet of one cylinder corresponds with the input of the next cylinder, with a first cylinder (60) connected to the first line (53) and a fourth cylinder (63) connected to the second line (54), said cylinders respectively comprising rods (70, 71, 72, 73);
   at least one second accumulator (b1);
   at least one second collection tank (b4) from which a second fluid is drawn,
   a turbine (b2) coupled to a generator (b3),
   a first conduit (91) connecting the second collection tank (b4) to the flow rate multiplier system;
   a second conduit (93) connecting the second accumulator to the turbine (b2)
   a third conduit (90) connecting a plurality of compression chambers (80, 81, 82, 83) to the second accumulator (b1); said rods (70, 71, 72, 73) protrude and penetrate the compression chambers;
   a fourth unidirectional valve (94) and a fifth unidirectional valve (95); and
   pressure reducers (a6) connected to second collection tank (b4), and positioned below the second collection tank (b4);
   WHEREIN, when the distributor (a4) is activated, said distributor switches from a central position to the right and left, alternately, in order to direct the first fluid to the first line (53) and then to the second line (54) to create an alternating motion between the four rods (70, 71, 72, 73) of said four cylinders;
   WHEREIN, the alternating movements of the distributor (a4) terminates when a minimum pressure in the accumulator is achieved, prompting a signal the distributor (a4); and
   WHEREIN, the pistons draw up the second fluid under pressure and sends the second fluid into the second accumulator (b1), and when a fill value is reached flows into the turbine and collected into the second collection tank and then to the pressure reducer.

2. The apparatus of claim 1 wherein the first fluid is oil and the second fluid is water.

3. The apparatus of claim 1 wherein said series of pistons are covered by a metal plate.

4. The apparatus of claim 1 wherein sealing gaskets are disposed on said first cylinder slider and second cylinder slider.

* * * * *